US 8,738,832 B1

(12) United States Patent
Oakenfull (10) Patent No.: US 8,738,832 B1
(45) Date of Patent: *May 27, 2014

(54) MICROGRID APPARATUS WITH CENTRAL AREA CONTAINING PLURAL PROCESSORS COMMUNICATING VIA RESPECTIVE WIRELESS CONNECTION POINT OR BI-DIRECTIONAL BUS WITH MODULE IN DOCKING BAYS DEFINED BY RADIAL ARMS

(75) Inventor: Ian Edward Oakenfull, Queensland (AU)

(73) Assignee: International Business Machines Corporation, Armonk, NY (US)

( * ) Notice: Subject to any disclaimer, the term of this patent is extended or adjusted under 35 U.S.C. 154(b) by 232 days.

This patent is subject to a terminal disclaimer.

(21) Appl. No.: 12/949,059

(22) Filed: Nov. 18, 2010

Related U.S. Application Data (63) Continuation of application No. 12/494,497, filed on Jun. 30, 2009, now abandoned.

(51) Int. Cl.
*G06F 1/16* (2006.01)
*G06F 13/38* (2006.01)

(52) U.S. Cl.
USPC .......................................... 710/305; 710/303

(58) Field of Classification Search
None
See application file for complete search history.

(56) References Cited

U.S. PATENT DOCUMENTS

| | | | |
|---|---|---|---|
| 5,243,704 A | 9/1993 | Baty et al. | |
| 5,253,141 A | 10/1993 | Hellwig et al. | |
| 5,301,089 A * | 4/1994 | Takashima | 361/744 |
| 5,537,111 A | 7/1996 | Martin et al. | |
| 6,242,984 B1 * | 6/2001 | Stones et al. | 330/295 |
| 6,598,124 B1 | 7/2003 | Damron et al. | |
| 7,343,222 B2 | 3/2008 | Solomon | |
| 7,461,130 B1 | 12/2008 | AbdelAziz et al. | |
| 7,521,138 B2 | 4/2009 | Pearson | |
| 7,594,015 B2 | 9/2009 | Bozak et al. | |
| 7,962,425 B1 | 6/2011 | Oakenfull | |
| 8,035,337 B1 | 10/2011 | Oakenfull | |
| 8,180,999 B1 | 5/2012 | Oakenfull | |
| 8,429,381 B1 | 4/2013 | Oakenfull | |
| 8,664,911 B1 | 3/2014 | Oakenfull | |

(Continued)

OTHER PUBLICATIONS

U.S. Appl. No. 12/494,497, filed Jun. 30, 2009, First Named Inventor Ian Edward Oakenfull, Expressly Abandoned Nov. 19, 2010. Notice of Abandonment Nov. 23, 2010.

(Continued)

*Primary Examiner* — Kenneth Kim
(74) *Attorney, Agent, or Firm* — Schmeiser, Olsen & Watts, LLP; John Pivnichny (57) ABSTRACT

A micro grid apparatus and a method for forming the micro grid apparatus. A selected complex shape is placed on a circuit board. At least two irregular shaped modules are selected. Each selected irregular shaped module is inserted into a respective docking bay of the complex shape to form the micro grid apparatus on the circuit board. The micro grid apparatus includes a central area and at least three radial arms connected to the central area. The radial arms are external to and integral with the central area. Each radial arm extends radially outward from the central area. Each pair of adjacent radial arms defines a docking bay. The central area includes at least two processors that are linked together wirelessly or by direct electrical connection. The at least two processors are linked wirelessly or by direct electrical connection to each inserted irregular shaped module.

24 Claims, 10 Drawing Sheets

(56) References Cited

U.S. PATENT DOCUMENTS

| | | |
|---|---|---|
| 2005/0160424 A1 | 7/2005 | Broussard et al. |
| 2007/0073861 A1 | 3/2007 | Amanuddin et al. |
| 2008/0027591 A1 | 1/2008 | Lenser et al. |
| 2008/0133052 A1 | 6/2008 | Jones et al. |
| 2010/0145536 A1 | 6/2010 | Masters et al. |
| 2013/0194737 A1 | 8/2013 | Oakenfull |

OTHER PUBLICATIONS

U.S. Appl. No. 12/497,818, filed Jul. 6, 2009, First Named Inventor Ian Edward Oakenfull, Expressly Abandoned Nov. 24, 2010. Notice of Abandonment Nov. 29, 2010.
U.S. Appl. No. 12/541,205, filed Aug. 14, 2009, First Named Inventor Ian Edward Oakenfull, Expressly Abandoned Dec. 13, 2010. Notice of Abandonment Dec. 16, 2010.
U.S. Appl. No. 12/609,057, filed Oct. 30, 2009, First Named Inventor Ian Edward Oakenfull, Expressly Abandoned Jan. 21, 2011. Notice of Abandonment Jan. 24, 2011.
U.S. Appl. No. 12/699,128, filed Feb. 3, 2010, First Named Inventor Ian Edward Oakenfull.
U.S. Appl. No. 12/699,177, filed Feb. 3, 2010; First Named Inventor Ian Eddward Oakenfull.
U.S. Appl. No. 12/952,716, filed Nov. 23, 2010, First Named Inventor Ian Edward Oakenfull.
U.S. Appl. No. 12/963,777, filed Dec. 9, 2010, First Named Inventor Ian Edward Oakenfull.
U.S. Appl. No. 13/010,123, filed Jan. 20, 2011, First Named Inventor Ian Edward Oakenfull.
Notice of Allowance (Mail Date Feb. 9, 2011) for U.S. Appl. No. 12/952,716, filed Nov. 23, 2010.
Ortiz et al.; Autonomous Collaborative Agents in Wireless Environments; SRI Presentations and Demos; SRI International; Department of the Navy Science & Technology; 23 pages.
Pravin Varaiya; Intelligent Autonomous Agents: Convergence of Communications, Networking, Adaptive Control, and Real-time Distributed Computing; University of California, Berkeley; pp. 0-22.
Anonymous: "Blade server"; Wikipedia; Jul. 3, 2009; pp. 1:6; XP002601339. [online]. Retrieved from the Internet: <URL: http://en.wikipedia.org/w/index.php?title=Blade_server&oldid=300051901 . [retrieved on Sep. 20, 2010].
Smith et al.; "Towards a Service-Oriented Ad Hoc Grid"; Parallel and Distributed Computing, 2004. Third International Symposium on/Algorithms, Models and Tools for Parallel Computing on Heterogeneous Networks, 2004. Third International Workshop on Cork, Ireland Jul. 5-7, 2004, Piscataway, NJ, USA, IEEE, Jul. 5, 2004. pp. 201-208.
Grnarov, Aksenti et al., "Grid Computing Implementation in Ad Hoc Networks"; 2008; Springer Science; Advances in Computer and Information Sciences and Engineering; pp. 196-201.
Wang et al.; "Wireless Grid Computing over Mobile Ad-Hoc Networks with Mobil Agent"; 2005; Proceedings of the First International Conference on Semantics, Knowledge and Grid (SKG 2005); 3 pages.
Office Action (Mail Date Sep. 12, 2011) for U.S. Appl. No. 13/048,158, filed Mar. 11, 2011.
U.S. Appl. No. 13/045,654, filed Mar. 11, 2011, First Named Inventor Ian Edward Oakenfull.
U.S. Appl. No. 12/699,177, filed Feb. 3, 2010, First Named Inventor Ian Edward Oakenfull.
U.S. Appl. No. 13/048,158, filed Mar. 15, 2011, First Named Inventor Ian Edward Oakenfull.
Notice of Allowance (Mail Date Jan. 17, 2012) for U.S. Appl. No. 13/048,158, filed Mar. 11, 2011.
Notice of Allowance (Mail Date May 17, 2011) for U.S. Appl. No. 13/045,654, filed Mar. 11, 2011.
Office Action (Mail Date Aug. 20, 2012) for U.S. Appl. No. 13/438,267, filed Apr. 3, 2012.
Notice of Allowance (Mail Date Jul. 2, 2013) for U.S. Appl. No. 13/010,123, filed Jan. 20, 2011.
Amendment filed Nov. 20, 2012, in respone to Office Action (Mail Date Aug. 20, 2012) for U.S. Appl. No. 13/438,267, filed Apr. 3, 2012.
Notice of Allowance (Mail Date Dec. 18, 2012) for U.S. Appl. No. 13/438,267, filed Apr. 3, 2012.
Notice of Allowance (Mail Date Jan. 17, 2012) for U.S. Appl. No. 13/048,158, filed Mar. 11, 2011; Confirmation No. 8166.
U.S. Appl. No. 13/438,267, filed Apr. 3, 2012; Confirmation No. 3757.
Notice of Allowance (Mail Date Jul. 2, 2013) for U.S. Appl. No. 13/010,123, filed Jan. 20, 2011; Confirmation No. 2099.
Office Action (Mail Date Aug. 20, 2012) for U.S. Appl. No. 13/438,267, filed Apr. 3, 2012; Confirmation No. 3757.
Amendment filed Nov. 20, 2012 in response to Office Action (Mail Date Aug. 20, 2012) for U.S. Appl. No. 13/438,267, filed Apr. 3, 2012; Confirmation No. 3757.
Notice of Allowance (Mail Date Dec. 18, 2012) for U.S. Appl. No. 13/438,267, filed Apr. 3, 2012; Confirmation No. 3757.

* cited by examiner

MICROGRID APPARATUS WITH CENTRAL AREA CONTAINING PLURAL PROCESSORS COMMUNICATING VIA RESPECTIVE WIRELESS CONNECTION POINT OR BI-DIRECTIONAL BUS WITH MODULE IN DOCKING BAYS DEFINED BY RADIAL ARMS

This application is a continuation application claiming priority to Ser. No. 12/494,497, filed Jun. 30, 2009, now abandoned.

FIELD OF THE INVENTION

The present invention relates to a micro grid system and associated functionality.

BACKGROUND OF THE INVENTION

The world is melting into a global internet village in which countries and states are literally becoming super-suburbs. Computer communication advancements are primarily fuelling exploding events in this global internet village.

Unfortunately, current technology does not use resources efficiently for responding to problems and challenges in this global internet village.

Thus, there is a need for an apparatus that enables efficient use of resources to accomplish tasks that are tailored to environments within this global internet village.

SUMMARY OF THE INVENTION

The present invention provides a micro grid apparatus, comprising a central area and at least three radial arms connected to the central area,
  wherein the radial arms are external to and integral with the central area,
  wherein each radial arm extends radially outward from the central area,
  wherein each pair of adjacent radial arms defines a docking bay,
  wherein each irregular shaped module of a plurality of irregular shaped modules is inserted into a respective docking bay of the defined docking bays,
  wherein the central area comprises a plurality of processors that are linked together wirelessly or by direct electrical connection, and
  wherein the plurality of processors are linked wirelessly or by direct electrical connection to each inserted irregular shaped module.

The present invention provides a method for forming a micro grid apparatus, said method comprising:
  selecting a complex shape;
  place the selected complex shape on a circuit board;
  selecting a plurality of irregular shaped modules;
  inserting each irregular shaped module of the selected plurality of irregular shaped modules into a respective docking bay of the complex shape to form the micro grid apparatus on the circuit board,
  wherein the micro grid apparatus comprises a central area and at least three radial arms connected to the central area,
  wherein the radial arms are external to and integral with the central area,
  wherein each radial arm extends radially outward from the central area,
  wherein each pair of adjacent radial arms defines a docking bay,
  wherein the central area comprises a plurality of processors that are linked together wirelessly or by direct electrical connection, and
  wherein the plurality of processors are linked wirelessly or by direct electrical connection to each inserted irregular shaped module.

The present invention advantageously provides an apparatus that enables efficient use of resources to accomplish tasks that are tailored to environments within a global internet village.

DETAILED DESCRIPTION OF THE INVENTION

Figure 1:
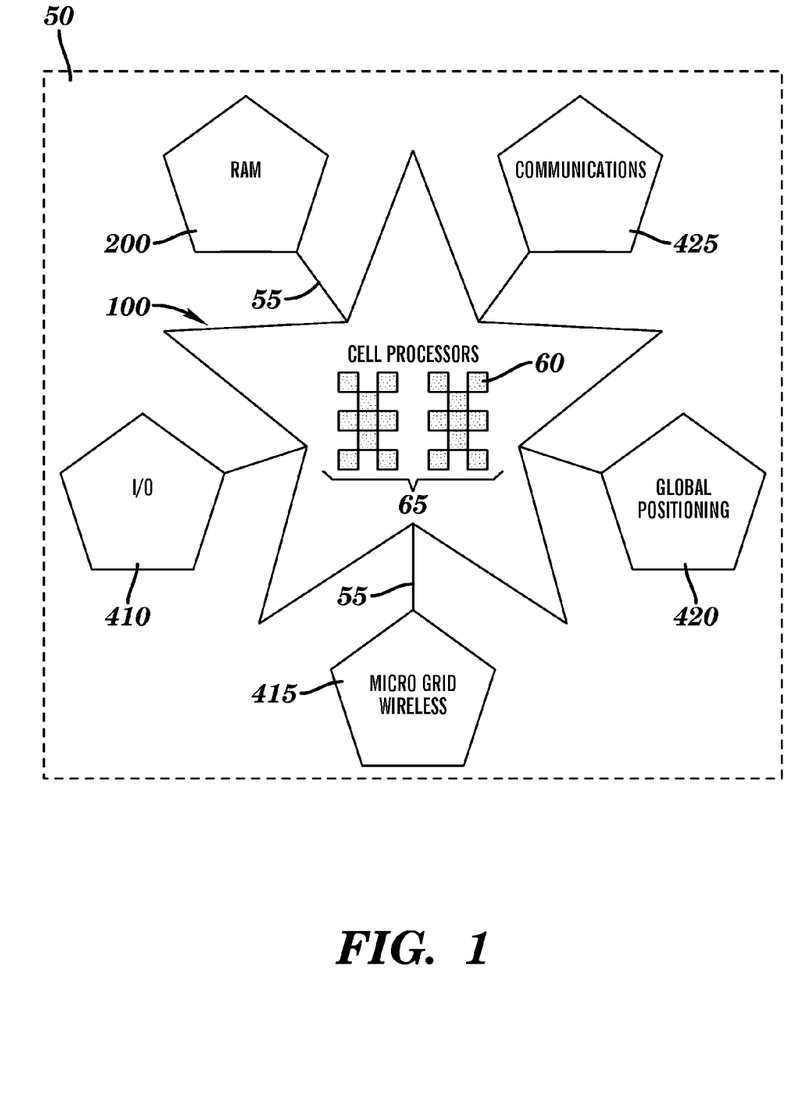
FIG. 1 is a diagram of a computer system comprising a micro grid apparatus and irregular shaped modules connected to the micro grid apparatus via respective connection interfaces, in accordance with embodiments of the present invention.

FIG. 1 is a diagram of a computer system 50 comprising a micro grid apparatus 100 and irregular shaped modules 200, 410, 415, 420, and 425 connected to the micro grid apparatus 100 via respective connection interfaces 55, in accordance with embodiments of the present invention. The micro grid apparatus 100 is also called a "complex shape".

The micro grid apparatus 100 is configured to enable the irregular shaped modules 200, 410, 415, 420, and 425 to be geometrically connected thereto via the respective connection interfaces 55. The connection interfaces 55 accommodate a V-shaped geometric connection between the irregular shaped modules 200, 410, 415, 420, and 425 and the complex shape of the micro grid apparatus 100.

Figure 2A:
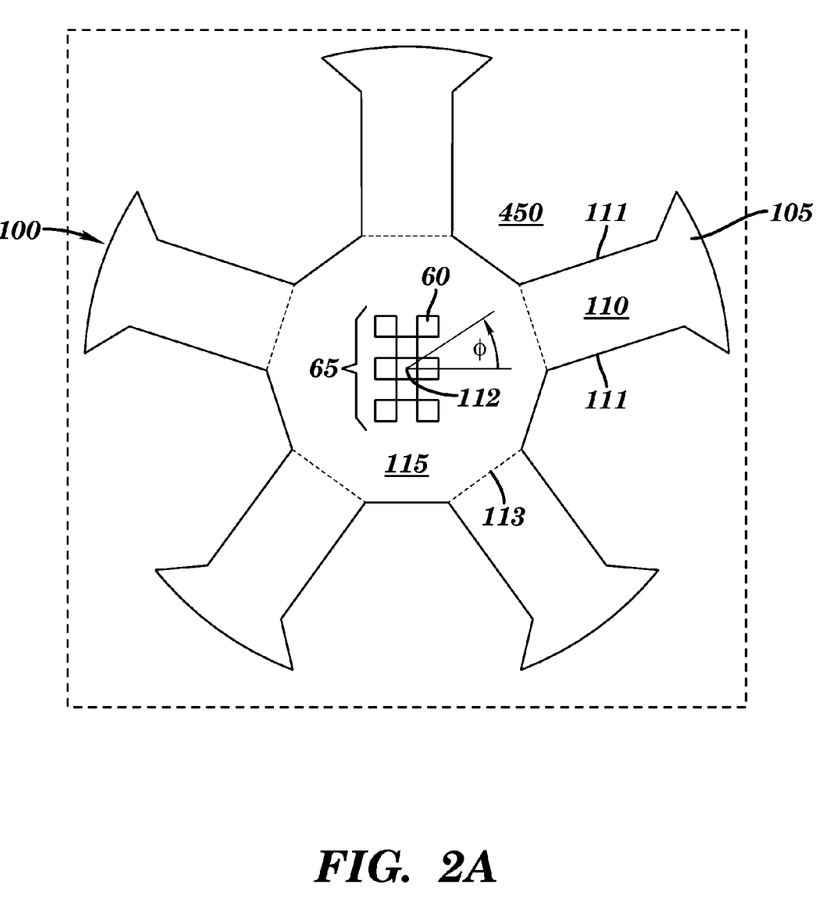
FIG. 2A is a diagram depicting the micro grid apparatus of FIG. 1, in accordance with embodiments of the present invention.

The micro grid apparatus 100 comprises a central area 115 (see FIG. 2A) that includes a micro grid, wherein the micro grid comprises a plurality of processors 65. In one embodiment, each processor of the plurality of processors 65 has a unique Internet Protocol (IP) address. The reference numeral "65" refers to the collection of processors that the plurality of processors consists of. In embodiments of the present invention, the plurality of processors 65 consists of nine or eighteen individual processors. In practice, the number of processors may be determined by design criteria, manufacturing considerations, etc. In FIG. 2A, a central area 115 of the micro grid apparatus 100 having a complex shape comprises a plurality of processors 65 consisting of nine processors with connection to a micro grid wireless module of irregular shape 415 and four other types of add-on hardware interface modules of the irregular shaped modules 200, 410, 420, and 425 (see FIG. 1) accommodated in the five docking bays 450. The central area 115 comprises a plurality of processors 65 that are linked together wirelessly or by direct electrical connection, and the plurality of processors 65 are linked wirelessly or by direct electrical connection to each irregular shaped module.

Each processor of the plurality of processors 65 has its own individual operating system and assigned resources (e.g., cache memory—not shown). The operating system within each processor of the micro grid apparatus 100 controls the programmatic housekeeping and individual processor availability and assignment of the micro grid, including allocation of random access memory of irregular shape 200 to the processors with common types of operating systems within the micro grid apparatus 100, and other communication interfaces of irregular shape 425. The processors within the apparatus 100 are linked by multiple data buses (not shown) for data transfer and electrical connection to each other where they collectively reside with their individual cache memory and cache controllers in the same physical apparatus. Contemporaneously, there are multiple operating systems actively functioning in the different processors of the same physical micro grid apparatus 100.

An assembled micro grid apparatus structure of the present invention is constructed from two physically different components: (1) the complex shape of the micro grid apparatus 100, which may embody the central processing unit's cell wafer including the associated cache memory, the cache controllers, and the associated electronic circuits of the micro grid apparatus 100; and (2) the closely packed modular irregular shaped modules (e.g., 200, 410, 415, 420, 425 for which there are five docking bays provided).

In FIG. 1, the five different irregular shaped modules, which may be selected and assembled for functional use by the micro grid apparatus 100, include: (1) the irregular shape 200 which embodies random access memory (RAM); (2) the irregular shape 425 which embodies communications comprising Transmission Control Protocol/Internet Protocol (TCP/IP) Ethernet, cable, and/or fiber optic communications; (3) the irregular shape 420 which embodies a global positioning system (GPS); (4) the irregular shape 415 which embodies micro grid wireless connection points (e.g., 18×802.11g micro grid wireless connection points); and (5) the irregular shape 410 which embodies input and output (I/O) support including data buffers for serial and parallel linked peripheral components and devices.

The irregular shaped modules 200, 410, 415, 420, and 425 are interchangeable and fit any docking bay in the micro grid apparatus 100 as determined by system architectural design. Different combinations, including multiples of one type of irregular shape, are permitted in an assembled apparatus. For example, three RAM modules 200, a micro grid wireless module 415, and a global positioning module 420 would facilitate a mobile micro grid apparatus 100 with a particularly large amount of memory; however it would not have I/O, or physical connectable communication functionality. Each irregular module is coupled by high speed bi-directional data buses available at the connection interface (e.g., 'V' shaped connection interface) 55. The total number of such data buses is equal to the total number of processors of the plurality of processors. For example, if the total number of such processors is 18, then the total number of such data buses is 18. The processors of the plurality of processors 65 contained in the complex shape of the micro grid apparatus 100 communicate individually via each of the available individual data buses (e.g., of 18 data buses) to the irregular shaped module 415, connected by the 'V' shaped connection interface 55.

Figure 8:
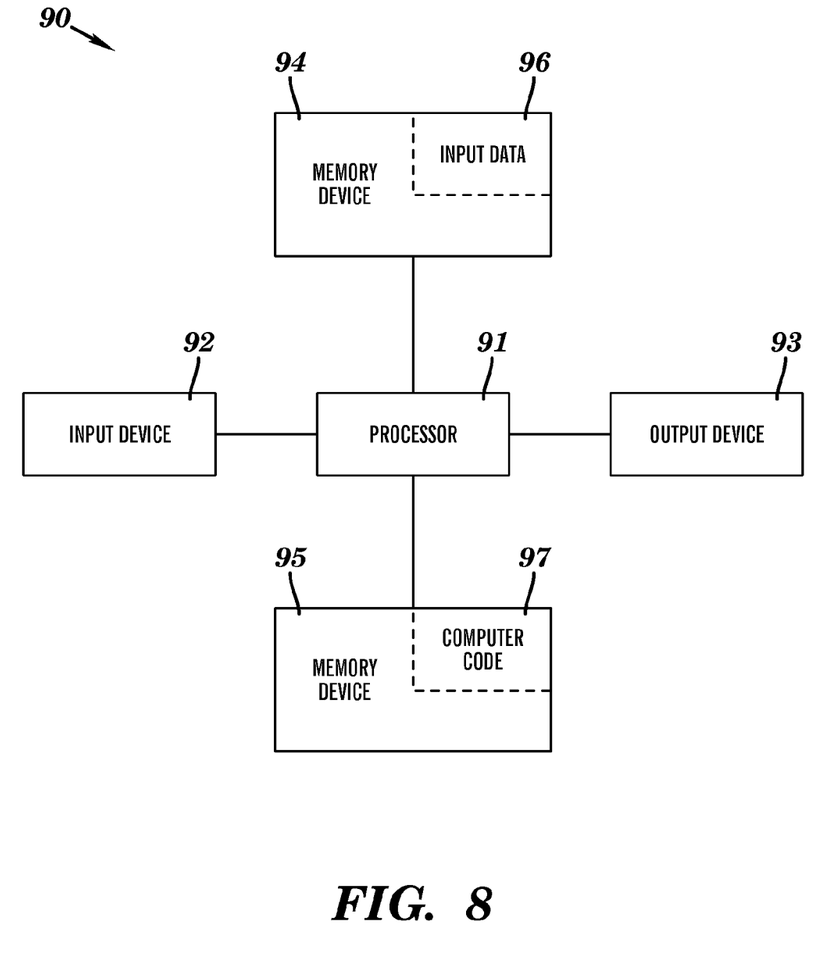
FIG. 8 illustrates an exemplary computing system used for implementing any process or functionality of any processor used in accordance with embodiments of the present invention.

The plurality of processors 65 includes a unique processor 60 having its unique operating system and is included among the associated micro grid of processors 65, and may include associated internal cache memory and cache memory control, main random access memory 200 for storing data and instructions while running application programs, a mass-data-storage device, such as a disk drive for more permanent storage of data and instructions, peripheral components such as monitors, keyboard, pointing devices, sensors and actuators which connect to the I/O module 410, data and control buses for coupling the unique processor 60 and its operating system to the micro grid processors and components of the computer system, and a connection bus 55 for coupling the micro grid processors and components of the computer system. FIG. 8, described infra, depicts an exemplary data processing apparatus in which any processor of the present invention may function.

The present invention utilizes one or more operating systems residing in single processors, and multiple operating systems residing in multiple processors, such as may be embodied on the same wafer, can be constructed with known software design tools and manufacturing methods.

The computer system 50 provides the following functionalities:

(1) Containment of the micro grid apparatus 100 and its I/O capability for detecting local alerts and peripheral device interfacing with I/O module 410, its communications capability for receiving alerts via communications module 425, its global positioning system module 420 for detecting location and change of location when mobile, its multiple wireless communications ability for data interchange via the micro grid wireless module 415, and its system memory storage via RAM module 200, embodied in a single apparatus incorporating a single complex shape, and coupled to selectable and interchangeable modules of irregular shape (e.g., module 415) is provided for.

(2) Enablement to heat dissipation of the complex shape of the micro grid apparatus 100 is provided for by two surfaces being available without obstruction by connection pins. Thus in one embodiment, no connection pins are connected to either or both of a top surface and a bottom surfaces of the central area 115. This physical method of forming the apparatus doubles the available surface area for heat dissipation capability and enhances known heat dissipation techniques for micro processors. The underside connection pins of the complex shape may be provided only on the radial arms to functionally facilitate dual heat dissipation contact devices on the top and underside of the complex shape. Thus in one embodiment, connection pins are connected to a bottom surface of at least one radial arm of the radial arms 110 and not to a top surface any radial arm 110. A suitable hole in the mountable multi-layered printed circuit board under the complex shape will accommodate the underside heat dissipation device.

(3) Enablement of modularity in micro computer structural design of the computer system 50 is provided by selecting all or any multiple combinations of available irregular shaped modules (e.g., 200, 410, 415, 420, and/or 425) and other 'interconnecting modules'. The method of the present invention forms a modular design with flexibility that provides for generalized micro grid functionality, as well as specialized micro grid functionality, and provides customized design functionality for larger and more complex grid computing systems constructed from a plurality of interconnected micro grids.

(4) Enablement of scaleable designs of the micro grid apparatus (by use and interconnection of multiple complex shapes) is provided for grid computing.

(5) Enablement of micro grid hardware design change and working system reconfiguration of a micro grid's functionality is provided. Irregular shaped modules (e.g., 200, 410, 415, 420, and/or 425) can be mechanically extracted from the complex shape and other irregular shaped modules selected and mechanically inserted in the resultant vacant docking bay as a design change preference to alter the micro grid functional design. A change of the irregular shaped modules 200, 410, 415, 420, and/or 425 provides for system software diversity by reconfiguration for a micro grid's functionality.

(6) Enablement of robotic micro grid maintenance and remote design change is provided. The irregular shaped modules are designed for ease of extraction and replacement. This feature enhances techniques for microprocessor maintenance by system engineers and facilitates robotic intervention for hardware fault elimination of irregular shaped modules in remote or dangerous locations (e.g., spacecraft probes in hostile atmospheres).

(7) Enablement of dynamic change of the operating system software functioning in each micro grid processor, by instruction from the unique processor 60, to function within the embodiment of a single apparatus.

FIG. 2A is a diagram depicting the micro grid apparatus 100 of FIG. 1, in accordance with embodiments of the present invention. The micro grid apparatus 100 comprises a central area 115 and five radial arms 110, wherein the radial arms 100 are external to and integral with the central area 115. A micro grid apparatus generally comprises a plurality of radial arms. For example, the number of radial arms may consist of 2, 3, 4, 5, 6, 7, 8, 9, 10, 11, 12, etc. or at least 2, 3, 4, 5, 6, 7, 8, 9, 10, 11, 12, etc. The central area 115 of the micro grid apparatus 100 provides hardware containment of a basic micro grid of 9 processors 65 each with its own operating system. The unique processor 60 has a unique operating system that differs from the operating system of each of the other processors. The unique processor 60 governs all other processors of the plurality of processors 65. The docking bays 450 are defined by adjacent radial arms 110 and accommodate irregular shaped modules such as irregular shaped modules 200, 410, 415, 420, and/or 425 discussed supra in conjunction with FIG. 1.

The processors are linked to each other via a system bus, a micro grid bus, and a macro grid bus. Known existing (and future designed) application software, operational system software, communications software, and other software including drivers, interpreters and compilers for micro processor systems may function within the embodiments of the present invention. Any irregular shaped module is able to connect to any of the five docking bays available in the complex ceramic chip structure in any combination, including the arrangement of five bridge modules attached to one complex ceramic chip structure. In one embodiment, Terrestrial and 802.11g Wireless Communication protocols and standards may be employed for use in the present invention. In one embodiment, the Mesh Wireless Communication 802.11s standard may be employed for use in the present invention. Circumstances (e.g., manufacturing, research, etc.) determine standards (e.g., 802.11g, 802.11s, and other existing wireless standards and future standards) that may be used in different embodiments or in different combinations in the same embodiment (e.g., inclusion of communication techniques such as 'Bluetooth').

In one embodiment, the outer curved edge 105 of the radial arm 110 is physically manufactured to the shape of a circle, resulting in the outer curved edge 105 of the radial arms 110 being at a radial distance (e.g., of 5 cm in this example) from a radial center 112 of the circle (i.e., the circle has a diameter of 10 cm in this example) within the central area 115 of the micro grid apparatus 100. Each radial arm 110 extends radially outward from the central area 115 and has an outer curved edge 105 disposed at a constant radial distance from the radial center 112. Thus, the outer curved edges 105 of the radial arms 110 collectively define a shape of a circle centered at the constant radial distance from the radial center 112. The circle has a diameter exceeding a maximum linear dimension of the central area 115. Each pair of adjacent radial arms 110 defines at least one docking bay 450 into which an irregular shaped module can be inserted. The total number of docking bays 450 is equal to the total number of radial arms 110. In one embodiment, one or more irregular shaped modules are inserted into respective docking bays 450 defined by adjacent radial arms 110. In one embodiment, the radial arms 110 are uniformly distributed in azimuthal angle φ about the radial center 112. In one embodiment, the radial arms 110 are non-uniformly distributed in azimuthal angle φ about the radial center 112, which may be employed in one embodiment to accommodate different sized irregular shaped modules with corresponding radial arms 110 that present different sizes and shapes of their 'V' interfaces.

The central area 115 of the micro grid apparatus 100 comprises a plurality of processors 65 that are electrically linked together and are electrically linked to each irregular shaped module that is inserted into a respective docking bay 450 defined by adjacent radial arms 110. The central area 115 has a polygonal shape (i.e., a shape of a polygon 113) whose number of sides is twice the number of radial arms 110. The dashed lines of the polygon 113 do not represent physical structure but are shown to clarify the polygonal shape of the polygon 113. In FIG. 2A, the polygon 113 has 10 sides which corresponds to the 5 radial arms 110. The polygon of the polygonal shape of the micro grid apparatus 100 may be a regular polygon (i.e., the sides of the polygon have the same length and the internal angles of the polygon are equal to each other) or an irregular polygon (i.e., not a regular polygon). The radial arms 110 may be uniformly distributed in azimuthal angle φ about the radial center 112. The radial arms 110 being uniformly distributed in azimuthal angle φ about the radial center 112 is a necessary but not sufficient condition for the polygon of the polygonal shape of the micro grid apparatus 100 to be a regular polygon. Accordingly, the radial arms 110 may be uniformly distributed in azimuthal angle φ about the radial center 112 such that the polygon is not a regular polygon. In one embodiment, the radial arms 110 are non-uniformly distributed in azimuthal angle φ about the radial center 112.

The central area 115 is structurally devoid of connection pins on the top and underside surfaces, enabling direct contact with heat dissipation devices on both surfaces. The radial arms 110 have connection pins on the underside (i.e., bottom) surface.

Five docking bays 450 for the irregular shaped modules (200, 410, 415, 420, 425) are provided between the radial arms 110. Each radial arm 110 has parallel sides 111 oriented in a radial direction and are 1.4 cm wide in this example. The arc at the outer curved edge 105 of the radial arm 110 has a chord of 2.7 cm in this example.

The connection interface 55 provides an electrical connection 'V' point for a system bus between the complex structure and the irregular shaped modules and is available along the edge of the docking bay 450 of the pentagonal shape of the central area 115 of the complex shape. The bus comprises individual bi-directional data buses (e.g., 18 data buses) capable of connecting the micro grid processors (e.g., 18 processors) with their own operating systems to their own individual wireless devices contained in the irregular shaped module 415 for micro grid wireless connection points. The mechanical connection is achieved by the irregular shaped module 415 press fitting its wedged connection point edge into a 'V' edged protrusion along the length of the complex shape; i.e., the docking bay's pentagonal edge.

Figure 2B:
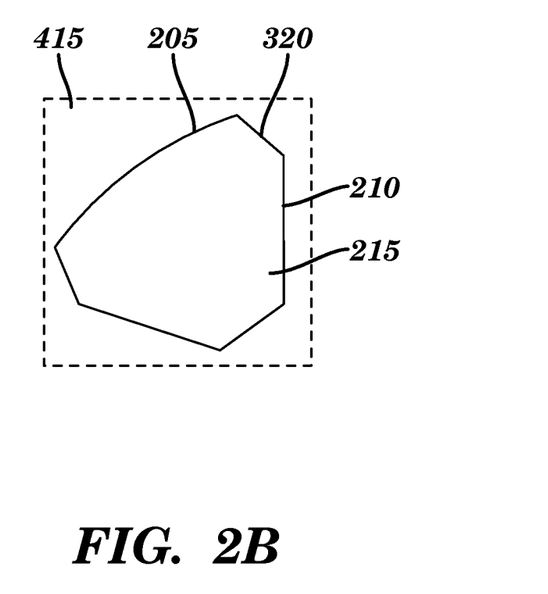
FIG. 2B is a diagram showing an irregular shaped module, in accordance with embodiments of the present invention.

FIG. 2B is a diagram showing an irregular shaped module 415, in accordance with embodiments of the present invention. The irregular shaped module 415 in FIG. 2B may alternatively be any other irregular shaped module such as the irregular shaped module 200, 410, 420, or 425. The irregular shaped module in FIG. 2B contains chip structure to provide hardware containment of the micro grid wireless interfaces and is latched into place with downward pressure on the curved edge 205 within the embrace of the docking bay after their electrical connection 'V' shaped receptacle edge has been positioned correctly and is in contact with the electrical connections of the complex shape's 'V' protrusion edge. The curved edge 205 in FIG. 2B is analogous to the curved edge 105 in FIG. 2A.

The latching mechanism on the radial arms 110 of the complex shape in FIG. 2A is provided as a raised and rounded protrusion of about 1.5 mm height×about 3.5 mm length along the edge 320 of both sides of the irregular module shape 415 in this example. This protrusion fits a receptacle with the same characteristics to receive the complex shape, on all the radial arm edges of the complex shape. In one embodiment, the irregular shaped modules are manufactured from a slightly softer molded material to provide the mechanical contraction against the harder ceramic form of the complex shaped module, thus enabling the latching mechanism to work. In one embodiment, the manufacturing is configured to create a relatively softer complex shaped module to accept relatively harder irregular shaped modules.

The irregular shapes are manufactured to fit perfectly within the docking bay 450 (see FIG. 2A), with less than 0.1 mm of gap tolerance around the non contact edges in this example. The gap tolerance (0.1 mm or otherwise) may be determined by the mechanics of the protrusion and receptacle latching mechanism described supra. The chord of the curved edge 205 is 3.5 cm and the non-contact side 210 of the irregular shaped module is 2.2 cm in length in this example. Connection pins are not present on the irregular shaped module, and similar to the complex shape, both top surfaces 215 and underside surfaces are available for contact with heat dissipation devices. External system devices such as a disk drive (not shown) for more permanent storage of data and instructions, and peripheral components such as monitors, keyboard, pointing devices, sensors and actuators, connect via the underside pins on the radial arms of the complex shape to the I/O irregular shaped module 410.

Similarly, the global positioning irregular shaped module 420 and the communications irregular shaped module 425 connect to their external associated hardware (i.e., physical antenna, cable and fiber connections) via the underside pins on the radial arms of the complex shape. The RAM irregular shaped module 200) and micro grid wireless module 415 do not necessarily require the use of connection pins under the complex shape as they are self contained and do not have any associated external hardware.

Figure 3:
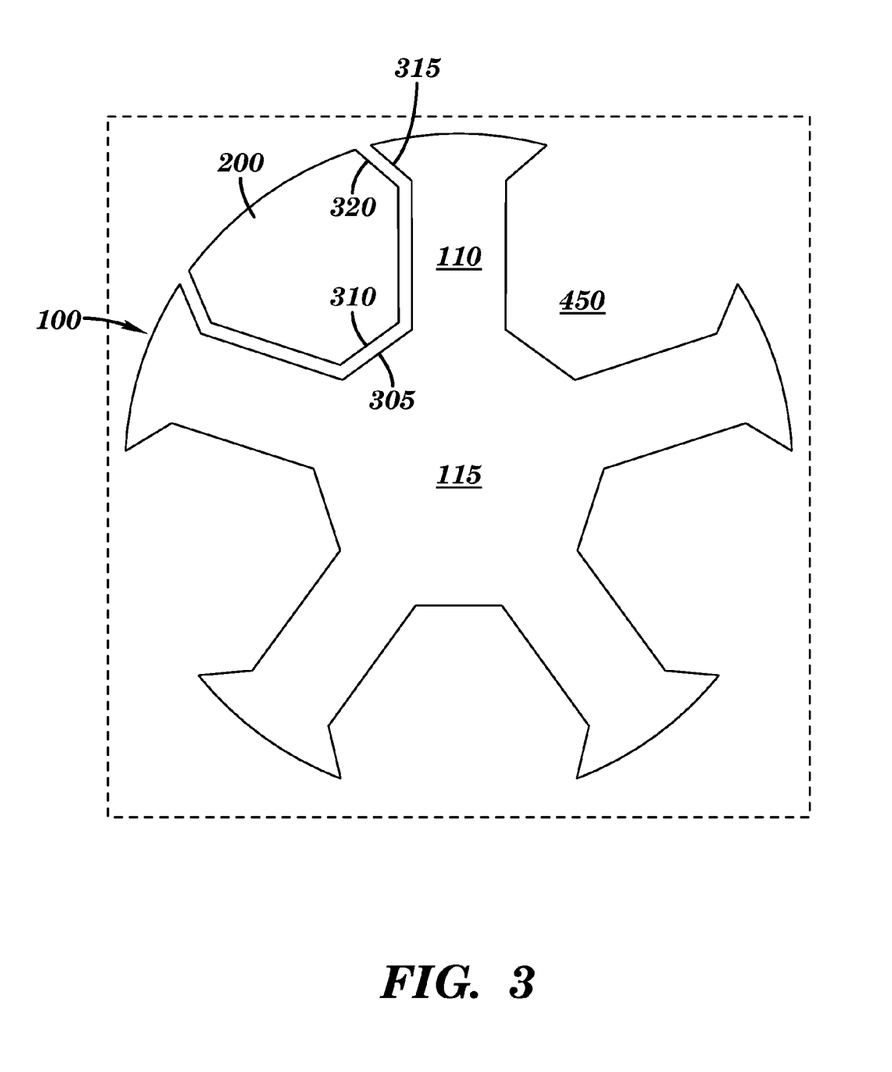
FIG. 3 is a diagram of the micro grid apparatus of FIG. 2A in which an irregular shaped module is inserted into an available docking bay, in accordance with embodiments of the present invention.

FIG. 3 is a diagram of a micro grid apparatus 100 of FIG. 2A in which the irregular shaped module 200, which may contain chip structures, is inserted into an available docking bay, in accordance with embodiments of the present invention. The irregular shaped module 200 in FIG. 3 may alternatively be any other irregular shaped module such as the irregular shaped module 410, 415, 420, or 425 in FIG. 1. The insertion of the irregular shaped module into an available docking bay depicted in FIG. 3 represents a first stage of assembly of a complete micro grid apparatus.

The electrical connection between the micro grid apparatus 100 and an irregular shaped module occurs at the pentagon's protrusion 'V' shaped edge 305 being in contact with the irregular shaped module's reception 'V' shaped edge 310.

Mechanical latching of the latching mechanism is achieved by conjunction of a receptacle insertion point 315 on all radial arms of the complex shape, and a rounded protrusion on the edge 320 of both sides of the irregular module shape. Downward pressure on the outer circular edge of the irregular shaped module inserts it into place. Extraction of the irregular shaped module occurs by mechanically lifting the outer circular edge 205 (see FIG. 2B) up, which unlatches the protrusion and reception conjunction point and draws the module up and away from the complex shape.

A manufactured mark on the top ceramic surface, along the edge 310 of the irregular shaped module, may be used to indicate the correct way the device is to be assembled, for ease of manufacturing and device replacement. A description of a cross sectional view of the assembled apparatus showing the installed position of the irregular shaped module is shown infra in FIG. 5B.

Figure 4:
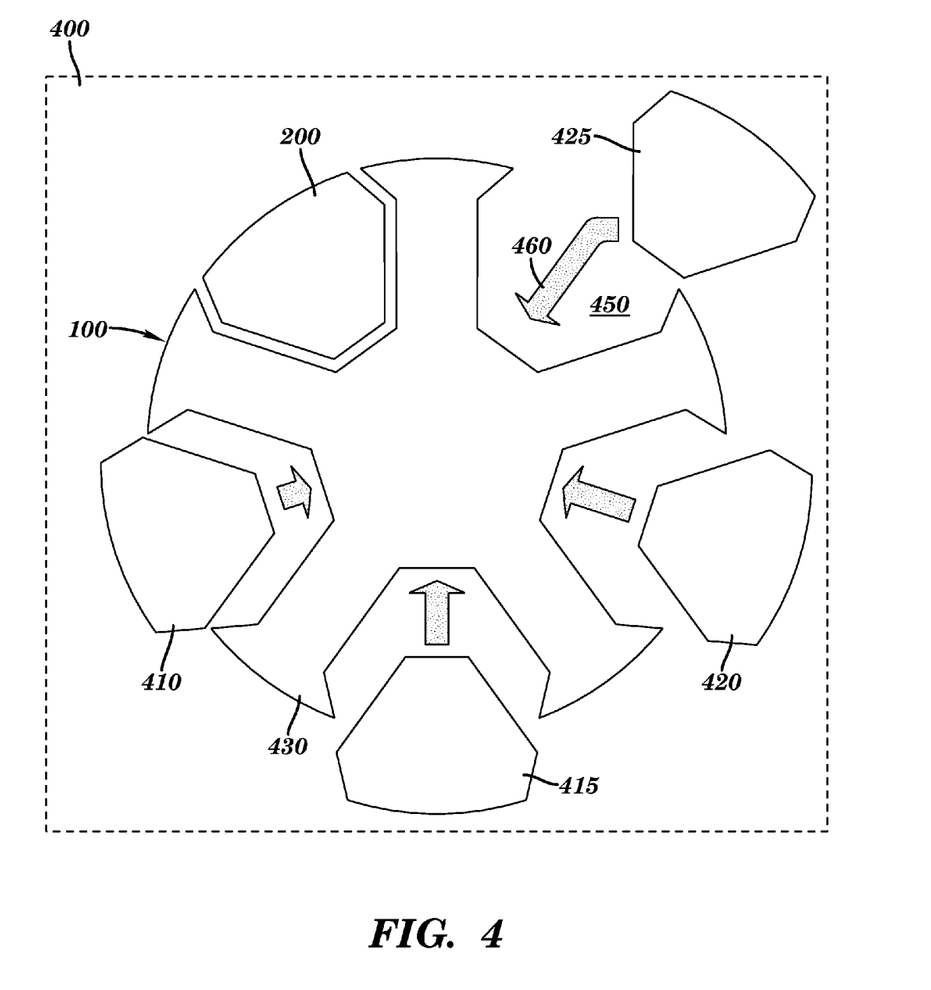
FIG. 4 is a diagram of the micro grid apparatus of FIG. 2A in which irregular shaped modules are fitted into all available docking bays, in accordance with embodiments of the present invention.

FIG. 4 is a diagram of the micro grid apparatus 100 of FIG. 2A in which irregular shaped modules 200, 410, 415, 420, and 425, which may contain chip structures, are fitted into all available docking bays, in accordance with embodiments of the present invention. Diagrammatic arrows 460 in FIG. 4 illustrate where the irregular shaped modules fit to complete the fully assembled micro grid apparatus 100. A flowchart describing the assembly of the micro grid apparatus is provided in FIG. 7A, described infra. A manufactured mark 430 on the top surface of the appropriate radial arm indicates the position of connection pin 1 for ease of manufacturing and device replacement.

Figure 5A:
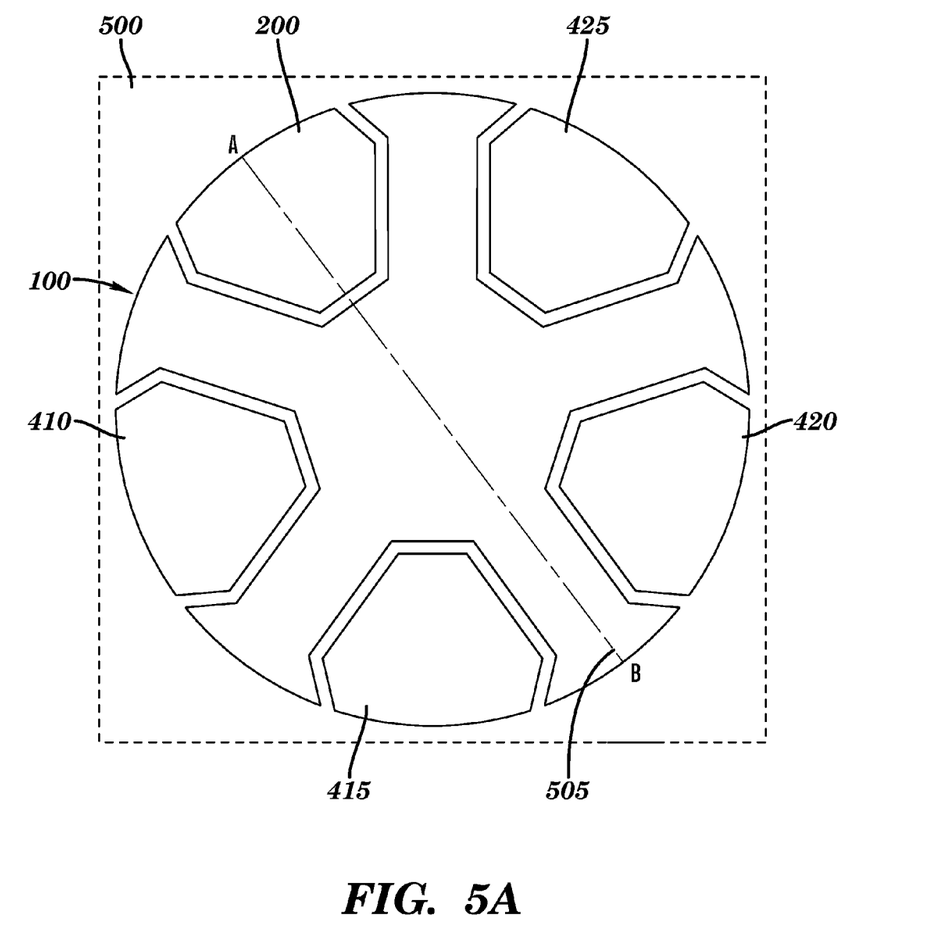
FIG. 5A is a diagram of a structure showing the completed assembly of the micro grid apparatus of FIG. 4, in accordance with an embodiments of the present invention.

FIG. 5A is a diagram of a micro grid apparatus 500 showing the completed assembly of the micro grid processor structure 400 of FIG. 4, in accordance with an embodiments of the present invention. In one embodiment, the assembled apparatus 500 is a circular shape which in this example is 10 cm in diameter and about 0.5 cm in height in the area of the central pentagon 115 (see FIG. 2A), and is about 0.3 cm in height at the circles' circumference.

Figure 5B:
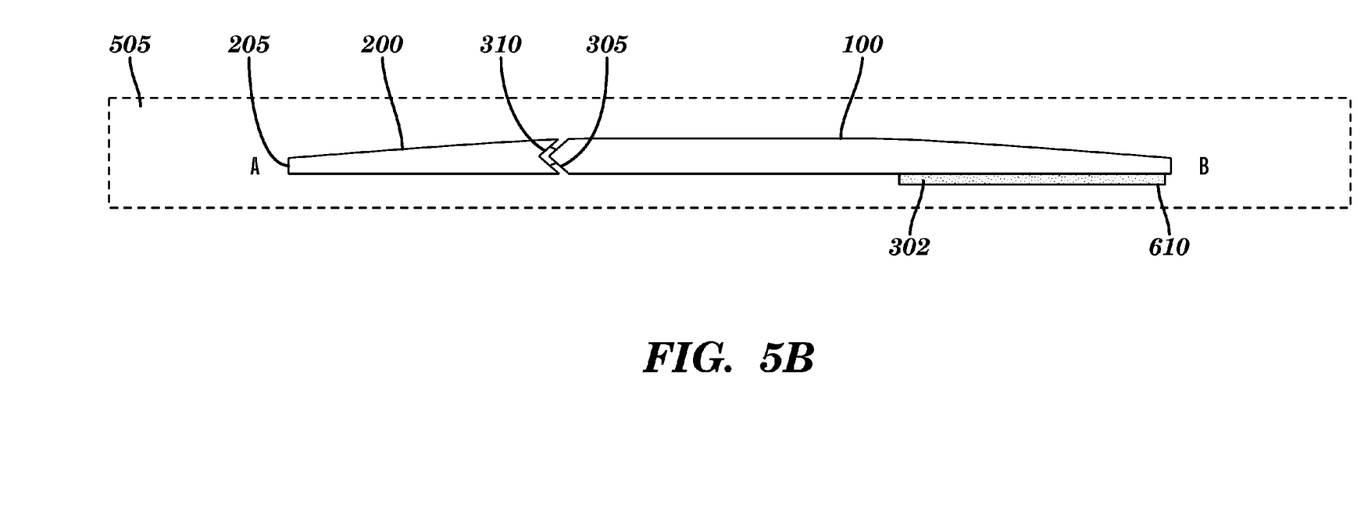
FIG. 5B is diagram of a cross-sectional view along a line A-B depicted in FIG. 5A, in accordance with an embodiments of the present invention.

FIG. 5B is diagram of a cross-sectional view along a line A-B depicted in FIG. 5A, in accordance with an embodiments of the present invention. FIG. 5B shows a vertical structure 505 between points A and B through the body of the assembled apparatus and shows in cross-section the 'V' shaped conjunction of the electrical data bus contact points of the irregular shaped module 200 (or any other irregular shaped module) with the complex shape of the micro grid apparatus 100 containing micro grid processors, and the shaded area under the complex structures' radial arms 110 where connection pins 610 are located.

Two heat dissipation surfaces are available without obstruction by connection pins. The underside connection pins 610 of the complex shape of the micro grid apparatus 100 have been provided only on the radial arms to functionally facilitate dual heat dissipation contact devices on the top and underside 615 (see FIG. 6, described infra) of the complex shape. A suitable hole in the mountable multi-layered printed circuit board under the complex shape accommodates the underside heat dissipation device.

Dual heat dissipation devices can also be accommodated on the irregular shaped modules if connection pins 610 are not present, and a similar hole exists in the same mountable multi-layered printed circuit board to facilitate the underside heat dissipation device for the irregular shaped modules.

Figure 6:
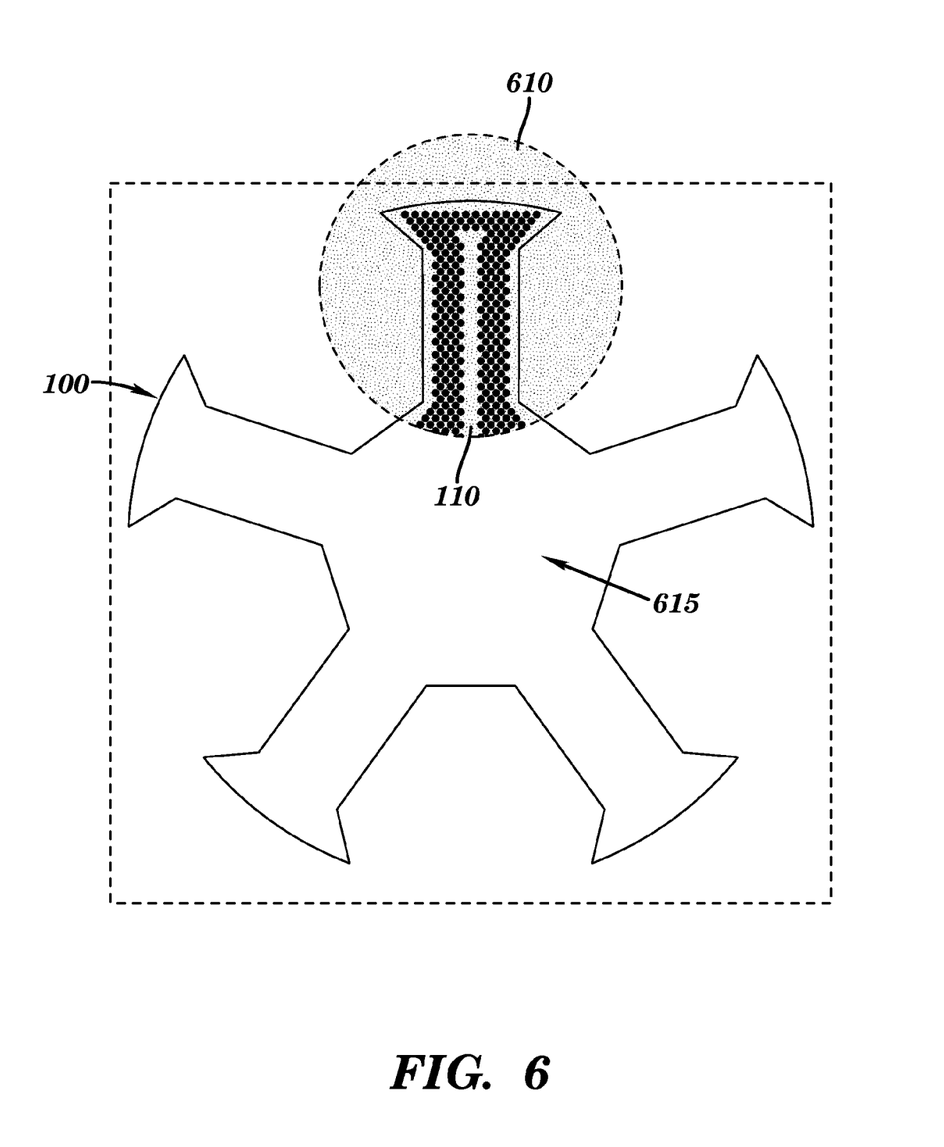
FIG. 6 is a diagram showing the underside surface of a complex shape of a micro grid apparatus for a ceramic chip structure, in accordance with embodiments of the present invention.

FIG. 6 is a diagram showing the underside surface 615 of a complex shape of a micro grid apparatus 100 for a ceramic chip structure, in accordance with embodiments of the present invention. A layout pattern 610 for the connection pins is shown on one radial arm and may likewise found on all the radial arms.

Two heat dissipation surfaces are available without obstruction with connection pins, the top surface 115 (see FIG. 2A) and the underside surface 615 of the complex shape.

Positioning the mountable multi-layered printed circuit board connection pins on radial arms achieves a structural purpose of providing more than 1250 electrical connection pins in one embodiment (i.e., more than 250 connection pins per radial arm) per assembled apparatus of structure 500 having 5 radial arms (see FIG. 5).

A structural purpose of mechanical lateral strength, for the docking of the irregular shaped modules, has also been achieved with pin containment connection carriages requiring placement on the mountable multi-layered printed circuit board under the radial arms of the complex shape. The pin containment connection carriages are soldered to the mountable multi-layered printed circuit board and also provide a release mechanism for the complex shape from the mountable multi-layered printed circuit board.

Figure 7A:
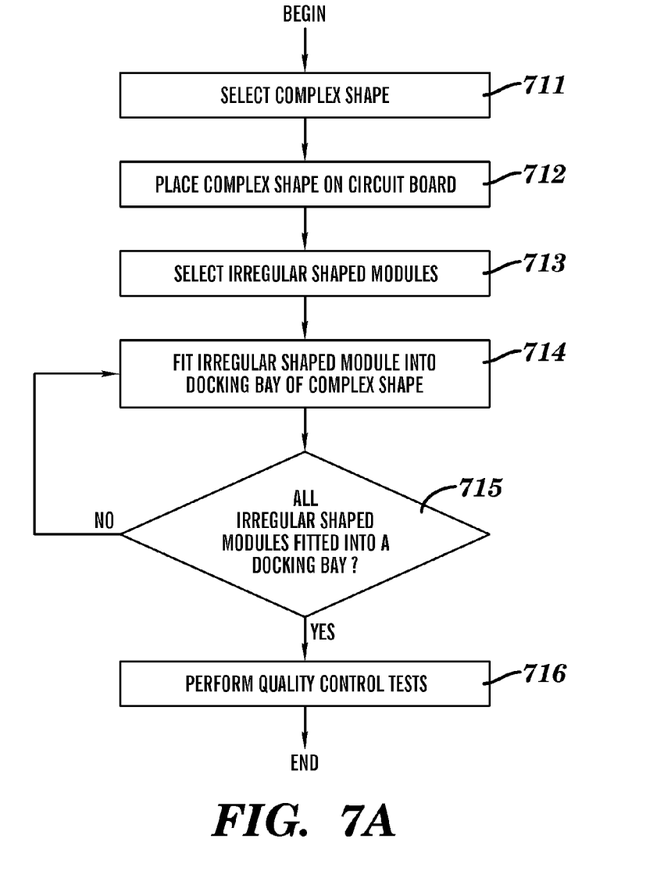
FIG. 7A is a flow chart describing a process for assembling the structure of FIG. 5A, in accordance with embodiments of the present invention.

FIG. 7A is a flow chart describing a process for assembling the structure 500 of FIG. 5A, in accordance with embodiments of the present invention. The flowchart of FIG. 7A comprises steps 711-716.

Step 711 selects a micro grid apparatus 100 having a complex shape. In one embodiment, the micro grid apparatus 100 represents a central processing unit. The manufactured mark 430 (see FIG. 4) on a radial arm of the micro grid apparatus 100 may be used to locate pin one.

Step 712 places the micro grid apparatus 100 with its complex shape on the circuit board, using multi-pin containment connection carriages soldered in place, said manufactured mark 430 (see FIG. 4) ensuring that pin one is in the correct position. The multi-pin containment connection carriages are designed with a release mechanism to enable the removal of the complex shape, if necessary, from its physical connection to the mountable multi-layered printed circuit board.

Step 713 selects irregular shaped modules to be fitted into respective docking bays of the micro grid apparatus 100. In one embodiment, the total number of irregular shaped modules to be fitted into respective docking bays of the micro grid apparatus 100 is equal to the total number of empty docking bays of the micro grid apparatus 100. In one embodiment, the total number of irregular shaped modules to be fitted into respective docking bays of the micro grid apparatus 100 is less than the total number of empty docking bays of the micro grid apparatus 100. In one embodiment, the respective docking bays are randomly selected for being fitted into by the selected irregular shaped modules. In one embodiment, docking bays specific to each selected irregular shaped module are selected for being fitted into by the selected irregular shaped modules.

Step 714 fits an irregular shaped module into a docking bay of the micro grid apparatus 100 (i.e., the complex shape). The multiple serial bus configured edge 310 of the irregular shaped module is fitted into one of the five protrusion electrical connection points on the complex structure's wedge shaped 'V' edge 305, by pressing down on the outer curved edge 205 of the irregular shaped module until the device edge(s) 315 and 320 latch into place (see FIG. 3) in the docking bay.

Step 715 determines whether all irregular shaped modules have been fitted into the docking bay. If Step 715 determines that all irregular shaped modules have not been fitted into the docking bay then the process loops back to step 714 to fit the next irregular shaped module into the docking bay; otherwise all docking bays of the complex shape are occupied with irregular shaped modules to form the assembled micro grid apparatus 100 (which has the appearance of, for example, the micro grid apparatus 500 of FIG. 5A with the fitted irregular shaped modules), and step 716 is next performed.

Step 716 performs mechanical assembly quality control tests before quality assurance approval of the assembled apparatus occurs. Then the mechanical assembly process of FIG. 7 is complete and ends.

Figure 7B:
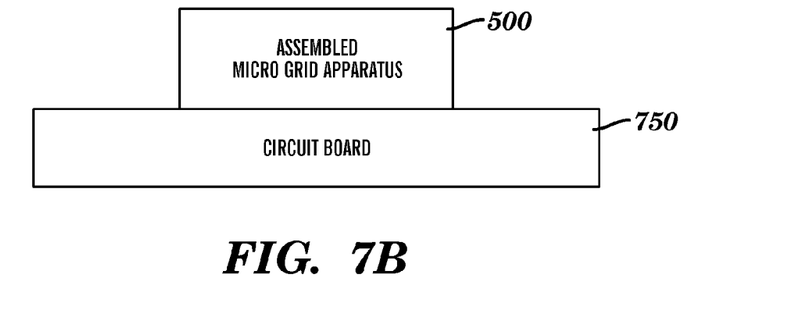
FIG. 7B depicts an assembled micro grid apparatus on a circuit board as a result of being formed by the process of FIG. 7A, in accordance with embodiments of the present invention.

FIG. 7B depicts an assembled micro grid apparatus 500 on a circuit board 750 as a result of being formed by the process of FIG. 7A, in accordance with embodiments of the present invention.

FIG. 8 illustrates an exemplary data processing apparatus 90 used for implementing any process or functionality of any processor used in accordance with embodiments of the present invention. The data processing apparatus 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for implementing any process or functionality of any processor used in accordance with embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 9) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Any of the components of the present invention could be created, integrated, hosted, maintained, deployed, managed, serviced, supported, etc. by a service provider who offers to facilitate implementation of any process or functionality of any processor used in accordance with embodiments of the present invention. Thus the present invention discloses a process for deploying or integrating computing infrastructure, comprising integrating computer-readable code into the data processing apparatus 90. Therefore, the code in combination with the data processing apparatus 90 is capable of performing any process or functionality of any processor used in accordance with embodiments of the present invention.

In another embodiment, the invention provides a method that performs the process steps of the invention on a subscription, advertising, and/or fee basis. That is, a service provider, such as a Solution Integrator, could offer to facilitate implementation of any process or functionality of any processor used in accordance with embodiments of the present invention. In this case, the service provider can create, integrate, host, maintain, deploy, manage, service, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 8 shows only one processor 91, the processor 91 may represent an array of processors such as the plurality of processors 65 coupled to the input device 92, the output device 93, and the memory devices 94 and 95.

While FIG. 8 shows the data processing apparatus 90 as a particular configuration of hardware and software, any configuration of hardware and software, as would be known to a person of ordinary skill in the art, may be utilized for the purposes stated supra in conjunction with the particular data processing apparatus 90 of FIG. 8. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A micro grid apparatus, comprising a central area and at least three radial arms connected to the central area,
    wherein the radial arms are external to and integral with the central area,
    wherein each radial arm extends radially outward from the central area,
    wherein each pair of adjacent radial arms defines a docking bay,
    wherein each irregular shaped module of a plurality of irregular shaped modules is inserted into a respective docking bay of the defined docking bays,
    wherein the central area comprises a plurality of processors that are linked together wirelessly or by direct electrical connection, and
    wherein each processor of the plurality of processors is linked wirelessly at a respective wireless connection point or by a respective bi-directional bus to each inserted irregular shaped module.

2. The micro grid apparatus of claim 1, wherein each processor of the plurality of processors has its own operating system.

3. The micro grid apparatus of claim 2, wherein a unique processor of the plurality of processors has a unique operating system that differs from the operating system of each of the other processors of the plurality of processors.

4. The micro grid apparatus of claim 3, wherein the unique processor governs all other processors of the plurality of processors.

5. The micro grid apparatus of claim 1, wherein the central area has a shape of a polygon whose number of sides is twice the number of radial arms.

6. The micro grid apparatus of claim 1,
    wherein the central area includes a radial center,
    wherein each radial arm has an outer curved edge disposed at a constant radial distance from the radial center, and
    wherein the outer curved edges of the radial arms collectively define a shape of a circle centered at the radial center.

7. The micro grid apparatus of claim 6, wherein the radial arms are uniformly distributed in azimuthal angle about the radial center, and wherein the polygon is a regular polygon.

8. The micro grid apparatus of claim 6, wherein the radial arms are uniformly distributed in azimuthal angle about the radial center, and wherein the polygon is not a regular polygon.

9. The micro grid apparatus of claim 1, wherein the modules of the plurality of irregular shaped modules are interchangeable with respect to being inserted into the respective docking bays.

10. The micro grid apparatus of claim 1, wherein no connection pins are connected to either or both of a top surface and a bottom surfaces of the central area.

11. The micro grid apparatus of claim 10, wherein connection pins are connected to a bottom surface of at least one radial arm of the defined radial arms and not to a top surface any radial arm of the defined radial arms.

12. The micro grid apparatus of claim 1, wherein the inserted irregular shaped modules are inserted into the respective docking bays by a latching mechanism.

13. A method for forming a micro grid apparatus, said method comprising:
    selecting a complex shape;
    place the selected complex shape on a circuit board;
    selecting a plurality of irregular shaped modules;
    inserting each irregular shaped module of the selected plurality of irregular shaped modules into a respective docking bay of the complex shape to form the micro grid apparatus on the circuit board,
    wherein the micro grid apparatus comprises a central area and at least three radial arms connected to the central area,
    wherein the radial arms are external to and integral with the central area,
    wherein each radial arm extends radially outward from the central area,
    wherein each pair of adjacent radial arms defines a docking bay, wherein the central area comprises a plurality of processors that are linked together wirelessly or by direct electrical connection, and wherein each processor of the plurality of processors is linked wirelessly at a respective wireless connection point or by a respective bi-directional bus to each inserted irregular shaped module.

14. The method of claim 13, wherein each processor of the plurality of processors has its own operating system.

15. The method of claim 14, wherein a unique processor of the plurality of processors has a unique operating system that differs from the operating system of each of the other processors of the plurality of processors.

16. The method of claim 15, wherein the unique processor governs all other processors of the plurality of processors.

17. The method of claim 13, wherein the central area has a shape of a polygon whose number of sides is twice the number of radial arms.

18. The method of claim 13, wherein the central area includes a radial center, wherein each radial arm has an outer curved edge disposed at a constant radial distance from the radial center, and wherein the outer curved edges of the radial arms collectively define a shape of a circle centered at the radial center.

19. The method of claim 18, wherein the radial arms are uniformly distributed in azimuthal angle about the radial center, and wherein the polygon is a regular polygon.

20. The method of claim 18, wherein the radial arms are uniformly distributed in azimuthal angle about the radial center, and wherein the polygon is not a regular polygon.

21. The method of claim 13, wherein the modules of the plurality of irregular shaped modules are interchangeable with respect to being inserted into the respective docking bays.

22. The method of claim 13, wherein no connection pins are connected to either or both of a top surface and a bottom surfaces of the central area.

23. The method of claim 22, wherein connection pins are connected to a bottom surface of at least one radial arm of the defined radial arms and not to a top surface any radial arm of the defined radial arms.

24. The method of claim 13, wherein the inserted irregular shaped modules are inserted into the respective docking bays by a latching mechanism.

* * * * *

UNITED STATES PATENT AND TRADEMARK OFFICE
CERTIFICATE OF CORRECTION

PATENT NO. : 8,738,832 B1
APPLICATION NO. : 12/949059
DATED : May 27, 2014
INVENTOR(S) : Oakenfull Page 1 of 1

It is certified that error appears in the above-identified patent and that said Letters Patent is hereby corrected as shown below:

On the title page, item [*] delete "this patent is subject to a terminal disclaimer".

Signed and Sealed this
Twenty-third Day of December, 2014

Michelle K. Lee
*Deputy Director of the United States Patent and Trademark Office*